United States Patent
Gillaspie (10) Patent No.: US 11,288,169 B2
(45) Date of Patent: Mar. 29, 2022

(54) METHOD OF, AND APPARATUS FOR, HANDLING REFERENCE IMAGES FOR AN AUTOMATED TEST OF SOFTWARE WITH A GRAPHICAL USER INTERFACE

(71) Applicant: Eggplant Limited, London (GB)

(72) Inventor: Jonathan Gillaspie, London (GB)

(73) Assignee: EGGPLANT LIMITED, London (GB)

( * ) Notice: Subject to any disclaimer, the term of this patent is extended or adjusted under 35 U.S.C. 154(b) by 0 days.

(21) Appl. No.: 15/348,363

(22) Filed: Nov. 10, 2016

(65) Prior Publication Data

US 2018/0129586 A1    May 10, 2018

(51) Int. Cl.
| | |
|---|---|
| *G06F 9/44* | (2018.01) |
| *G06F 11/36* | (2006.01) |
| *G06K 9/00* | (2022.01) |
| *G06K 9/46* | (2006.01) |

(52) U.S. Cl.
CPC ...... *G06F 11/3664* (2013.01); *G06F 11/3688* (2013.01); *G06F 11/3696* (2013.01); *G06K 9/00442* (2013.01); *G06K 9/00456* (2013.01); *G06K 9/00463* (2013.01); *G06K 9/00483* (2013.01); *G06K 9/4604* (2013.01); *G06K 2009/4666* (2013.01)

(58) Field of Classification Search
CPC .......................... G06F 11/3688; G06F 11/3692
See application file for complete search history.

(56) References Cited

U.S. PATENT DOCUMENTS

| | | | | |
|---|---|---|---|---|
| 2011/0214107 | A1* | 9/2011 | Barmeir | G06F 11/3684 717/125 |
| 2011/0286631 | A1* | 11/2011 | Wagner | G06K 9/32 382/103 |

(Continued)

FOREIGN PATENT DOCUMENTS

| | | | | |
|---|---|---|---|---|
| EP | 2743832 | A1 * | 6/2014 | ........ G06F 11/3692 |
| EP | 2743832 | A1 | 6/2014 | |

OTHER PUBLICATIONS

Great Britain Patent Application No. GB1717862.5 Combined Search and Examination Report dated Nov. 24, 2017 (10 pages).

(Continued)

*Primary Examiner* — Chat C Do
*Assistant Examiner* — Lenin Paulino (57) ABSTRACT

A method for performing an automated computer test that causes a test computer system to control a graphical user interface (GUI) of a system under test (SUT). The method includes: a) receiving a reference image representative of an expected image on the GUI of the SUT, the reference image having an image boundary; b) identifying whether one or more text characters are present within the image boundary; c) responsive to any identified text characters in step b), defining a mask region within the reference image boundary based on the identified text characters; d) identifying a transformed expected image on the GUI of the SUT using one or more transforms of the reference image, the identifying comprises matching an unmasked portion of a transformed reference image to a portion of the GUI; e) responsive to the identification of a transformed expected image, performing subsequent operations and/or verification steps on the SUT.

11 Claims, 7 Drawing Sheets

(56) References Cited

U.S. PATENT DOCUMENTS

| | | | | |
|---|---|---|---|---|
| 2011/0293140 | A1* | 12/2011 | Wagner | G06T 7/40 |
| | | | | 382/103 |
| 2012/0064204 | A1* | 3/2012 | Davila | H04N 1/00188 |
| | | | | 426/231 |
| 2012/0243745 | A1* | 9/2012 | Amintafreshi | G06F 11/3688 |
| | | | | 382/103 |
| 2013/0132830 | A1* | 5/2013 | Bell | G06F 40/106 |
| | | | | 715/253 |
| 2014/0033091 | A1* | 1/2014 | Schein | G06F 9/451 |
| | | | | 715/764 |
| 2015/0378968 | A1* | 12/2015 | Varadarajan | G06F 11/368 |
| | | | | 715/237 |
| 2018/0173614 | A1* | 6/2018 | Gong | G06F 3/0304 |

OTHER PUBLICATIONS

Notification of Grant for Great Britian Application Serial No. GB1717862.5 (dated Jan. 5, 2021).

Intention to Grant for Great Britian Application Serial No. GB1717862.5 (dated Nov. 12, 2020).

Examination Report for Great Britian Application Serial No. GB1717862.5 (dated Apr. 9, 2020).

* cited by examiner

METHOD OF, AND APPARATUS FOR, HANDLING REFERENCE IMAGES FOR AN AUTOMATED TEST OF SOFTWARE WITH A GRAPHICAL USER INTERFACE

CROSS-REFERENCE TO RELATED APPLICATIONS

None

BACKGROUND

Field of the Disclosure

The present disclosure relates to an improved method of, and apparatus for, handling reference images for use with a computer test description for testing of computer programs such as software applications. More particularly, the present disclosure relates to a method of, and apparatus for, handling text in a selected transformed reference image.

Description of Related Art

Modern software products can be increasingly complex, as can the devices that run these products. It is often required to roll out a software application across a range of different devices and operating systems. A program developer often has to take into account such different operating systems, communication protocols and system hardware when developing new software. As a result, it is often difficult to ensure that a software product is functional across a complete range of devices and operating systems, and that any errors, flaws, failures, or faults (otherwise known as 'bugs') in the software product are identified. Typically, these 'bugs' are only discovered when the software is run. The testing of a software product, pre-launch, is therefore important to a software developer.

Software test engineers commonly test the functionality and behaviour of a program. When performing testing, it is desirable to test out the software on a large number of devices and operating systems to ensure the product is ready for widespread sale. Accordingly, a tester may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

Test programs are known to test the functionality of a SUT. Typically the test program is run upon a computing device or computing system that is remote from the SUT. The computer system running the test program is however in communication with the SUT so that the test program can interact with the SUT. The SUT may be, for example, a PC running a version of Microsoft Word® upon a Windows 10® operating system.

Test programs typically test a SUT by interacting with the SUT and validating the state of the SUT according to an input test description. Test descriptions may also be referred to as automated test descriptions. Test descriptions can take many forms including but not limited to text instructions, software in source code or binary form, work-flows in a diagrammatical form (such as a flow chart). Typically, test descriptions contain lines of text or other characters that when executed by the test program cause the SUT to perform particular actions or execute functions. Therefore executing (or 'running') the test description through the test program allows the system under test to be tested automatically, without requiring a test engineer to provide input to the testing process, other than initiating it.

Some test programs that use automated test descriptions are known. One test program that helps software engineers automate the testing process is 'eggPlant®' by TestPlant®. The eggPlant® software tool allows a user to create and subsequently execute an automated test description to test a large number of SUTs. This test program interacts and controls a SUT by receiving and analysing images of the SUT Graphical User Interface (GUI).

Test programs such as eggPlant® that utilise GUI images operate by identifying expected objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified. Examples of image objects may include: an image of a button on the GUI that when 'clicked' would open a dialogue box, or the presence of a particular graphical object that signified the completion of a particular action performed by the target program. The test program may use image analysis techniques to perform these comparisons.

The test description is typically created either manually and/or automatically by a tester using the test program. Where commands in the test description require the use of reference images as described above, the user creating the test description manually selects the desired portion of a GUI image (taken from the SUT being tested) using an image selection tool whereby the selected portion of the GUI image is saved as the reference image. Thus, when the test description is completed and subsequently run automatically by the test program to test a further SUT, the same testing steps are performed upon the further SUT.

It is known that different devices use different screen resolutions and formats. For example, a mobile device is likely to have a much lower screen resolution than a desktop computer. Therefore, it is often necessary to scale the reference image used by the test description in order to match correctly the image to be detected.

However, a problem can occur when selecting particular images. This is because different operating systems and different hardware systems may scale images and image components differently. Therefore, an image on one configuration of SUT may not be scale invariant with respect to the same image on a different SUT configuration.

Therefore, a technical problem may arise that differences in an image between different SUTs may lead to erroneous test failures because a reference image may not match the detected image. Consequently, the image analysis to identify an expected image object using a reference image may fail unexpectedly or erroneously.

SUMMARY

According to a first aspect of the present disclosure there is provided a method for performing an automated computer test, the automated test being configured, when executed, to cause a test computer system to control a graphical user interface (GUI) of a system under test (SUT) comprising one or more computer programs being executed upon a computer device, the method comprising: a) receiving a reference image representative of an expected image on the GUI of the SUT, the reference image having an image boundary; b) identifying whether one or more text characters are present within the image boundary of the reference image; c) responsive to any identified text characters in step b), defining a mask region within the reference image boundary based on the identified text characters; d) identifying a transformed expected image on the GUI of the SUT using one or more transforms of the reference image, wherein the step of identifying comprises matching the unmasked portion of a transformed reference image to a portion of the GUI of the SUT; e) responsive to the identification of a transformed expected image, performing subsequent operations and/or verification steps on the system under test if required.

In one embodiment, subsequent to step d), the method further comprises: f) applying one or more image transformations to the reference image to generate one or more transformed reference images.

In one embodiment, the one or more image transformations are applied only to the unmasked portion of the reference images to generate transformed reference images.

In one embodiment, the one or more image transformations are applied to the whole of the reference image and a correspondingly transformed mask applied to the transformed reference image(s).

In one embodiment, step c) further comprises determining the boundaries of the or each text character in the reference image.

In one embodiment, step c) further comprises defining the mask region to be equal or greater than the boundaries of the or each text character in the reference image.

In one embodiment, the transform comprises a dimensional scaling of the reference image and the transforms of the reference image comprise one or more dimensional scalings of the reference image.

In one embodiment, the transform comprises a rotation of the reference image and the transforms of the reference image comprise one or more respective rotations of the reference image.

In one embodiment, the transform comprises a stretch or skew of the reference image and the transforms of the reference image comprise one or more respective stretches or skews of the reference image.

In one embodiment, step b) comprises identifying one or more text characters using optical character recognition.

In one embodiment, step b) further comprises storing the identified text characters as text characters associated with the reference image.

In one embodiment, subsequent to step d), responsive to the identification of a transformed expected image within a portion of the GUI of the SUT, the method further comprises: g) identifying, within the portion of the GUI of the SUT, any text characters.

In one embodiment, subsequent to step g), the method further comprises: h) comparing the identified text characters within the portion of the GUI of the SUT with the text characters associated with the reference image.

In one embodiment, step e) is only carried out responsive to identification of the expected image and a correspondence between the identified text characters within the portion of the GUI of the SUT and the text characters associated with the reference image.

In one embodiment, steps a) to c) are performed prior to execution of an automated test on a SUT.

In one embodiment, steps a) to c) are performed during execution of an operation or validation step during an automated test on a SUT.

In one embodiment, the one or more transforms of the reference image, are generated responsive to the failure to identify a transformed expected image using the reference image.

According to a second aspect of the present disclosure, there is provided a computer readable medium comprising instructions configured when executed to perform the method of the first aspect.

According to a third aspect of the present disclosure, there is provided a computer system comprising: a processing device, a storage device and a computer readable medium of the second aspect.

BRIEF DESCRIPTION OF THE DRAWINGS

Embodiments of the present disclosure will now be described in detail with reference to the accompanying drawings, in which:

FIG. 9 shows an example of a bitmask applied to the icon of FIG. 7a; and

There is presented herein an improved method for identifying an expected image in a GUI of a SUT as part of an automated computer test. The methods presented herein may be performed upon the executing of instructions stored upon one or more computer readable media. A system is also provided that is configured to perform the method/s as described herein.

DETAILED DESCRIPTION

The SUT and Test System

Figure 1:
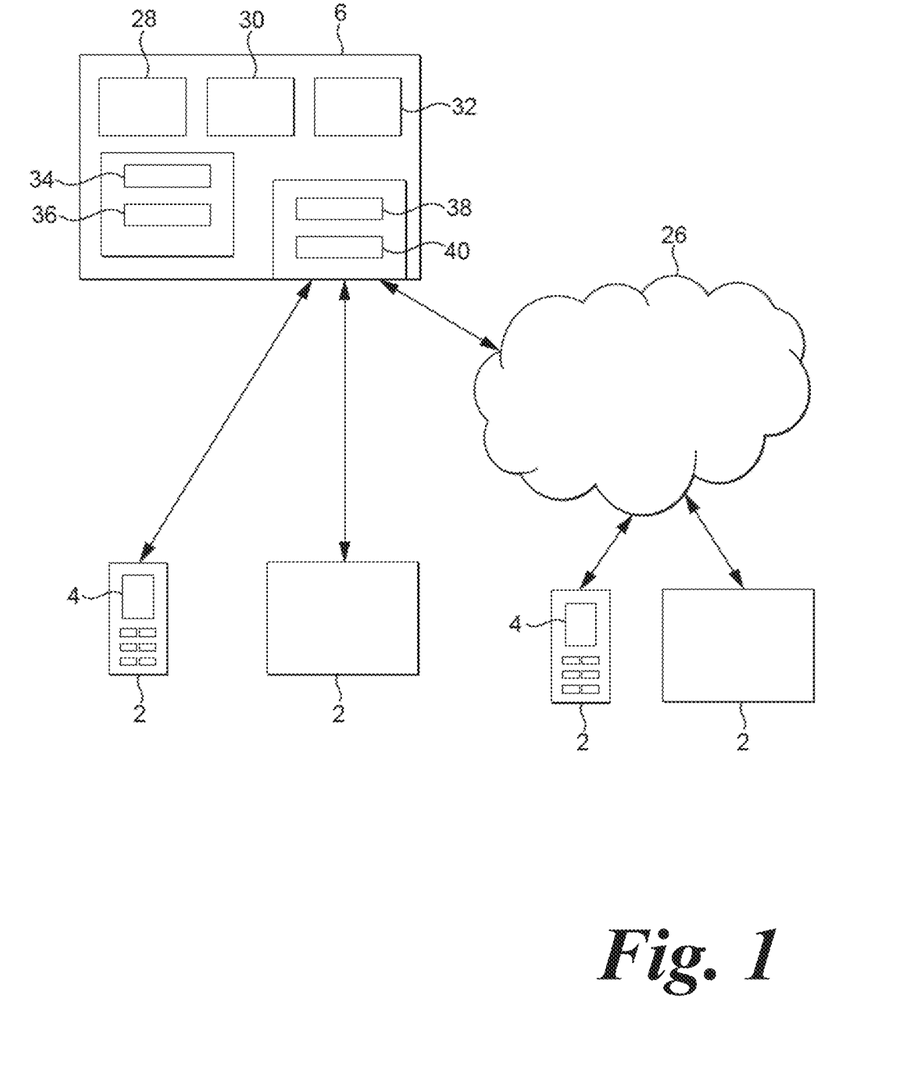
FIG. 1 shows an example of a test computer system that is in communication with several systems under test.

FIGS. 1 to 4 show exemplary aspects of a test system and SUT. FIG. 1 shows an example of a test computer system in communication with a number of different SUTs.

Figure 2:
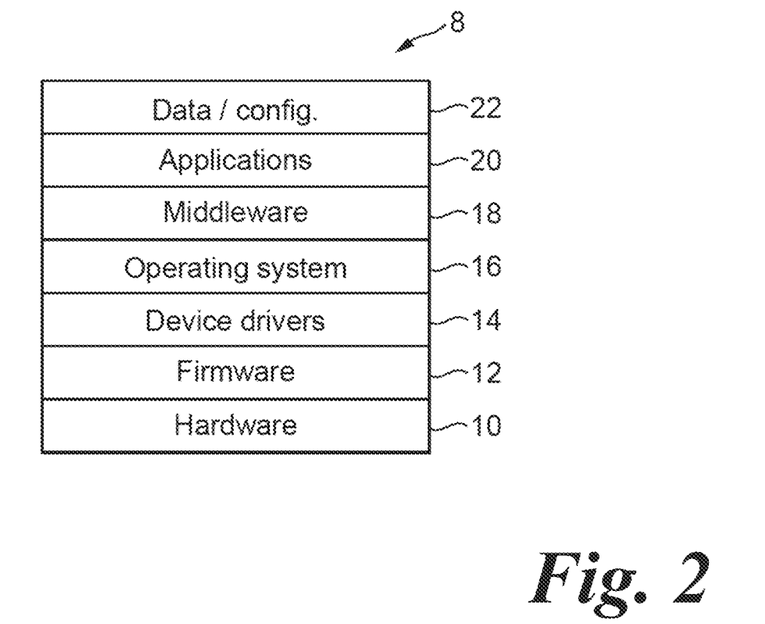
FIG. 2 shows an example of a hardware/software stack model representation for a system under test.
Figure 3:
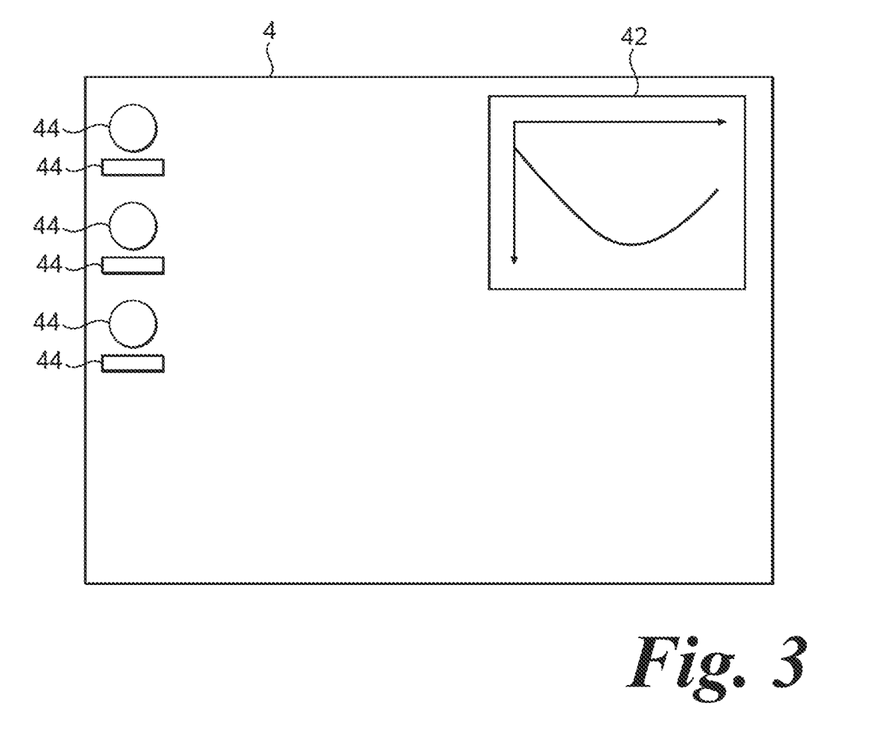
FIG. 3 shows an example of a GUI for a system under test.
Figure 4:
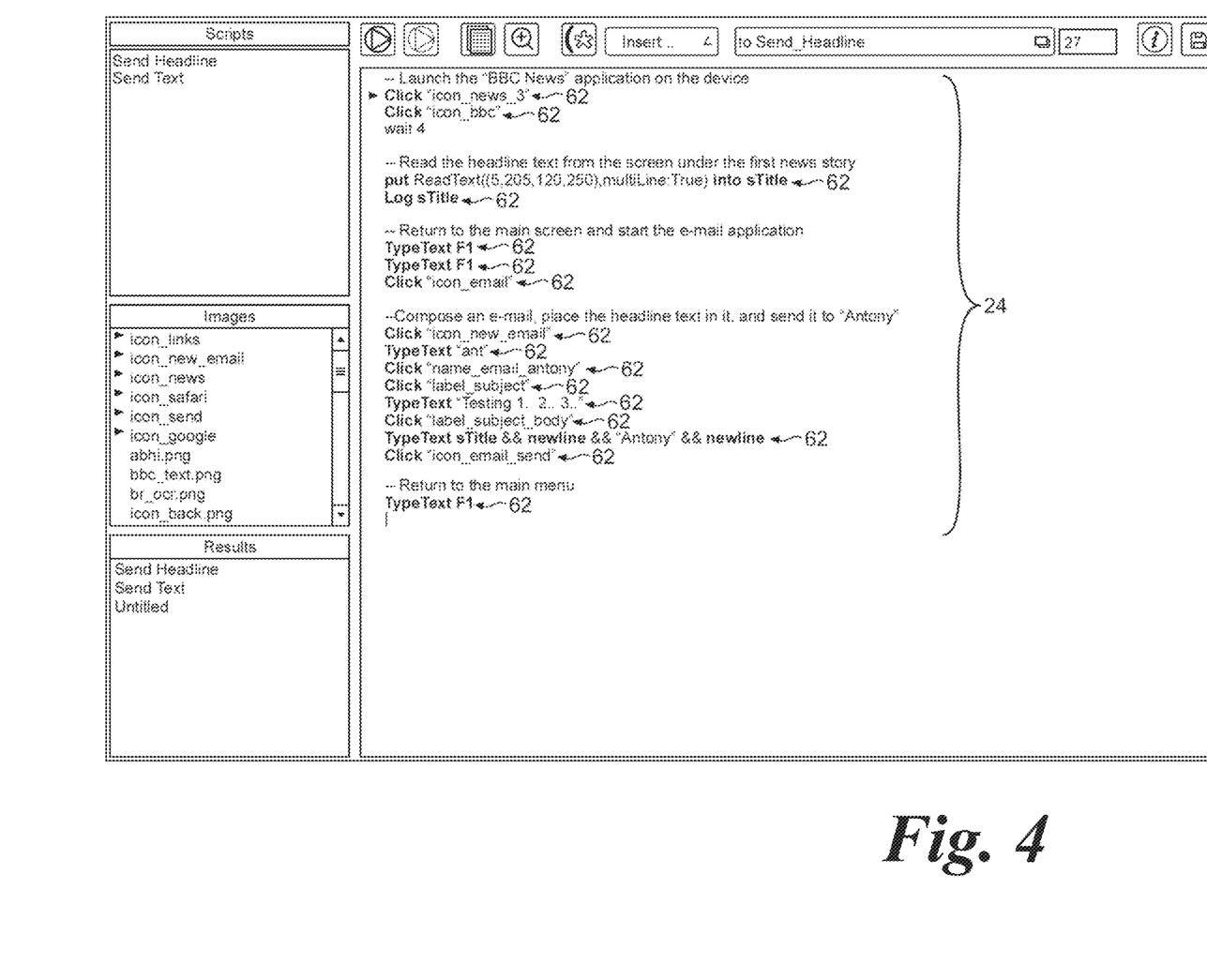
FIG. 4 shows an example of a test description.

FIG. 2 shows an exemplary hardware/software stack for an SUT. FIG. 3 shows an example of a GUI of a SUT on which image identification is performed. Finally, FIG. 4 shows an example of a test description which can be executed on the SUT as part of an automated test.

With reference to FIGS. 1 to 4, the automated test is configured when executed, to cause a test computer system 6 to communicate with a SUT 2. This is achieved through transfer of data, either directly or indirectly, between the SUT 2 and the test computer system 6. Data may be communicated in any suitable manner, i.e. data may be sent directly or indirectly from the test computer system 6 to the SUT 2 and/or data may be sent directly or indirectly from the SUT 2 to the test computer system 6.

By communicating with the SUT 2, the test computer system 6 is operable to interact with the SUT 2, for example by receiving GUI 4 images and/or sending commands to control the SUT 2. The automated test description is typically configured, when executed by a test program, to test the functionality and/or behaviour of a SUT 2.

FIG. 1 shows an example of a test computer system 6 in communication with a number of SUTs 2. Two SUTs 2 are in direct communication with the test computer system 6, for example using infrared or Bluetooth communications, or over a local wired or wireless network, whilst two other SUTs are in communication with the test computer system 6 via the internet 26.

The test computer device/system 6 may be any suitable computer device, system, collection of computing devices or collections of computing systems. The test computer system 6 may, in non-limiting examples, comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel® processor, an AMD® processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

The SUT 2 comprises one or more computer programs being executed upon a computer device. The SUT 2 may be remote from the test computer system 6. The term 'remote' is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

The SUT 2 can be any computing system or device running one or more computer programs. FIG. 2 shows an example model of a hardware/software stack 8 for a SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically a SUT 2 will at least comprise hardware 10 and an operating system 16. FIG. 2 is only an example of a hardware/software stack model 8. Other models with further details and layers may also be used to define a SUT 2. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/output devices. The term 'firmware' 12 is taken to mean any persistent memory and the program code/data stored within it, such as but not limited to, an embedded system. The term 'device drivers' 14 is taken to mean the one or more programs that operate to control a particular type of device incorporated into or attached to the computer device/system. The term 'operating system' 16 is taken to mean the one or more pieces, often a collection, of software that manages computer hardware and provides common services for computer programs. The term 'middleware' 18 is taken to mean the computer software that provides services to software applications beyond those available from the operating system 16. The term "applications" 20 is taken to mean the computer software that causes a computing device or system to perform tasks that are typically beyond the running of the computer itself. The term 'data/config.' 22 is taken to be any other information provided to the SUT 2 that can be used to affect its running or output, for example data input into the application program 20.

A SUT 2 may comprise a different physical device to another SUT 2 as shown in FIG. 1. For example, the SUTs may be different physical computing devices running the same application program 20 using the same or different application program 20.

Alternatively, a SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 2 from hardware 10 to application program 20, may give rise to a different SUT 2.

The SUT 2 has a GUI 4 as shown in FIG. 3. Typically when the test computer device interacts with the SUT 2, it does so using a test program that executes a test description 24 which utilises the GUI 4 to identify "expected images" as will be described.

FIG. 4 shows an example of a test description 24 run within a test program. Typically the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

Typically, the test description 24 forms part of an "automated test". The test description 24 comprises multiple lines of text, numbers or other symbols that are typically executed by the test program in a sequential manner. In other words, the test description 24 is typically lines 62 of text or other characters that typically contain instructions, that when executed by the test program, cause the SUT 2 to perform particular actions or execute functions. An instruction in the description 24 can include one or more standard commands and/or one or more other pieces of information or data. For example, the command "Typetext" may be followed by the words "This is a test". The test program running the automated test would execute the standard command "Typetext" to cause the SUT 2 to type the words "This is a test" into a particular text entry box on the SUT GUI 4.

The automated test may have further metadata associated with the description. Such metadata may be, an image associated with a particular instruction in the description. The test may be stored using one or more storage device or computer readable media as described herein.

For the purposes of this application, when reference is made to the test program running the test description, this is taken to mean the running of the automated test. The term "test description" may also be termed throughout the application as an "automated test description".

The description 24 may be written in any suitable scripting language, for example SenseTalk®. Preferably the description is loadable onto a carrier device such as a disc, memory stick or any other suitable electronic data carrier.

In non-limiting examples, a test program is used to execute the test description 24. However, the functionality required to execute the test description 24 may be hosted by an operating system or any other software or dedicated hardware, for example the test description 24 may be a standalone executable file itself.

Reference Image Acquisition and Analysis

The test program may utilise one or more GUI 4 images received directly or indirectly from the SUT 2. FIG. 3 shows an example of this. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

The SUT 2 may send these GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

The GUI images may be sent continuously by the SUT 2 at a particular update frequency, for example the SUT 2 may send a new GUI image to the test computer every 0.3 seconds. It may not be necessary to send the entirety of the GUI image or images in an update. For example, in an embodiment, only the pixels of the GUI image which have changed since the last update may be sent.

The GUI images provided in the image updates according to the example above and any of the methods/systems described herein, may in principle be one or more images. The images may be rectangular or take any other shape and be in any image format such as '.bmp,' '.jpeg', '.png' file format.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6.

Typically, at a given line in the description 24, the test computer/program will select the latest GUI image stored by the memory element and perform an image analysis on the GUI image to find a particular reference or "expected" image. The expected image may be the whole GUI image or one or more parts of the GUI image. For example, FIG. 3 shows a number of possible images that could be used as an expected image. Icons and corresponding labels 44, and image 42 may be possible candidates for expected images.

The GUI image that the test computer 6 compares, to find the expected image may, in some situations, only include the one or more sub section/s of the GUI 4 output most recently sent by the latest GUI image update from the SUT 2. Alternatively, the GUI image that is compared may be a composite image based upon all the GUI images sent by the SUT 2 that represent the current whole GUI 4 output.

The expected image may be an image that indicates a particular action has been accomplished by the SUT, for example, the expected image may be part of a dialogue box. The expected image may be an image that represents an interactive feature on the GUI of the SUT that the test program wishes to utilise. For example, consider a round start button, which when selected and activated on the SUT GUI 4 will cause a pop-up menu to appear. The test program can then further utilise this pop up menu in the testing of the SUT 2. The expected image may be the whole GUI image or one or more parts of the GUI image.

When performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image.

Expected images contained within the GUI image may be associated with "events" that are activate-able within the SUT 2 as discussed above. These "events" may be utilised by the test program. Each event is executable in the SUT 2 by the selection of a particular one or more activating pixels or "hotspots". The hotspots may be within the expected image or outside of the expected image. For example, the hotspot may be one of the pixels making up the "a" of the word "Start" in a start menu.

In embodiments, the reference images are selected by the tester in dependence upon the desired output or test to be run. Consider, for example, the GUI 70 of FIG. 5. The GUI 70 comprises a "start" button 72, a browser window 74 and a plurality of icons 76. Within the browser window 74 is displayed an internet banking page. The internet banking page has an image 78 of a building and a login icon 80.

Figure 5:
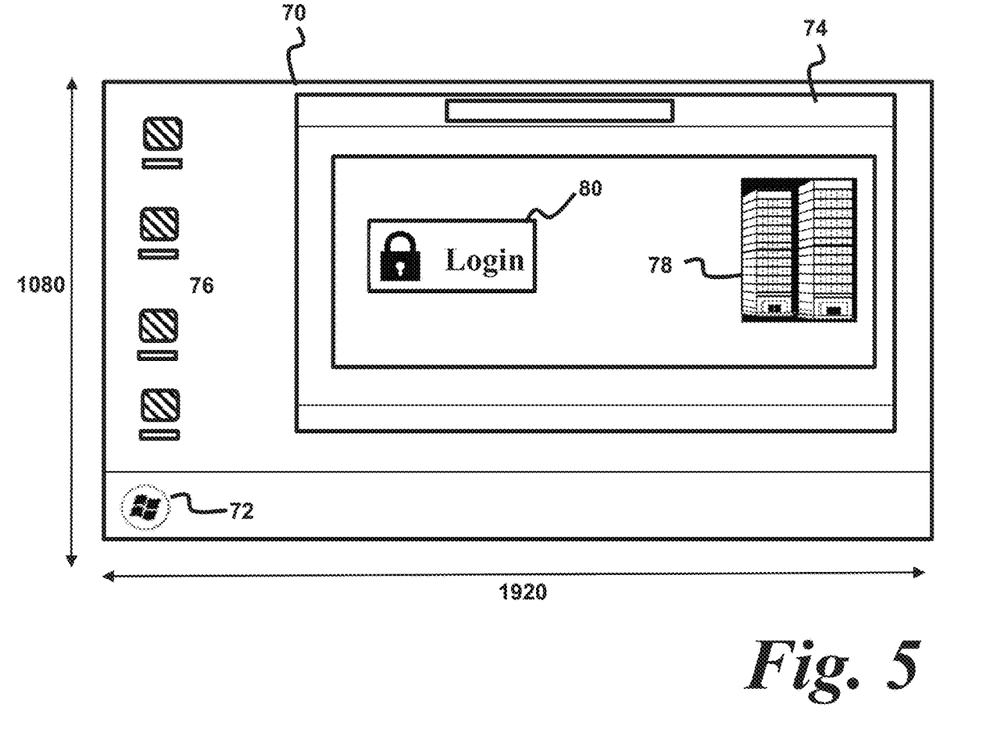
FIG. 5 shows an example of a GUI.

For example, a test description may be arranged to click on the "Login" icon/button 80 and look for a specific menu item or configuration to appear (e.g. a username and password login page to appear).

The tester then selects a reference image based upon the desired script item and to represent a correct output from a test action, e.g. a mouse click on the "Login" icon button 80.

The test description created in this manner may be used across a range of hardware and software configurations, e.g. a non-exhaustive list may include a PC, a smartphone or tablet, all potentially comprising different hardware and software configurations. In addition, different screen resolutions, aspect ratios and orientations may be present across these devices.

Therefore, the test program has the functionality to perform image analysis to match the reference image to the respective portion of the GUI image using image analysis techniques. For example, it may be necessary to transform the reference image to find a match with the GUI image. Typically, but non-exhaustively, this will involve scaling of a reference image to "match" the GUI image, with the scaling essentially being proportional to the difference between the resolution/aspect ratio of the SUT on which the reference image was captured and the SUT which is currently under test.

An example of the use of image analysis transforms is given below.

Figure 6:
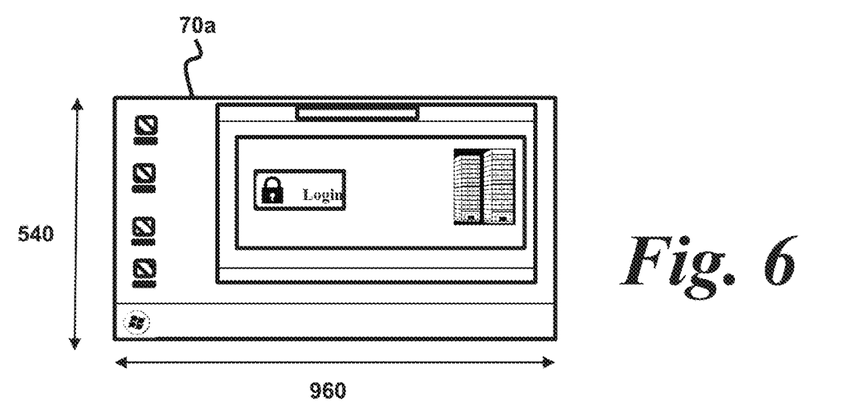
FIG. 6 shows an alternative GUI having a different resolution from the GUI of FIG. 5.

An example of using a transform as described herein is shown with reference to FIGS. 5 and 6. FIG. 5 shows the previously-described GUI 70 which is a graphical output from a reference SUT when the script (test description) is created. This GUI display 70 has a resolution of 1080p (1920×1080 pixels). Consider that the tester wishes to test two aspects—the effect of selecting the login button 80 and the effect of selecting the start icon button 72.

When creating the test description, or at any time before running the test description on the SUT in question, the tester selects the images 72, 80 as reference images that are stored at the selected resolution (i.e. 1080p) and size as metadata in the test description. Therefore, when the test description is automatically run as an automated test on a SUT, the automated test can use the stored references 72, 80 image to locate the same/similar graphical element within an output screen shot of the SUT.

FIG. 6 shows the graphical output of the SUT when being controlled by the local computer using the test description previously generated using the reference SUT outputting the screen shot shown in FIG. 5. In this example the SUT being currently tested is different to the reference SUT used to output the screen image in FIG. 5. In this case, the currently being tested SUT is running a different hardware/operating system configuration and has output the same GUI 70a but at half the resolution (i.e. 960×540 pixels).

When the test description uses image analysis to try and match images within the GUI 70a to the saved reference images corresponding to icons 72 and 80, it may fail due to the different image size. The failure will not be representative of the SUT and GUI 70a failing to operate correctly, but an erroneous failure of the local computer to find the saved reference images that are actually present.

To help circumvent this issue, the example described herein creates one or more image transforms of the saved image and searches the screen shot of FIG. 6 using this image element transform.

The transformation is, generally, an image transformation involving scaling and/or rotation of the reference image to find a match. In this example, scaling is used. However, this is not to be taken as limiting and alternatively and/or additionally other transforms may be used, for example: one or more of: a colour transformation of the saved image; a resolution transformation of the saved image; a one-dimensional (asymmetric) scaling of the saved image; a rotation of the saved image; a vertical mirroring of the saved image; a horizontal mirroring of the saved image; a stretching of the saved image; a skewing of the saved image.

In this example shown in, the saved reference images of elements 72, 80 are transformed by scaling by a half. When searching for the expected image elements 72, 80 in the screen shot 70a from the SUT shown in FIG. 6, by using the scaled versions of the saved reference images, the test program finds the downscaled expected images corresponding to the saved reference images of icons 72, 80.

The information used to determine the type and quantity/degree of transformation may be obtained in any suitable way including, but not limited to, automatically determining transform data from analysing the configuration of the SUT (either alone or relative to the reference SUT), the user creating the script specifying one or more transforms, or any other suitable method of inputting transform data.

Any number of transforms of the saved image may be made, including of different types. For example, the transforms may include three different scaling factors and three different colours for each scaling (hence nine different transformations in total). The transforms of the saved image may be completed at any time, including, but not limited to, before running the test description on the SUT or during the running of the test description on the SUT.

The use of the transformed images may be made after an image search has failed using the original (untransformed) image. Alternatively the transformed images may be used instead of using the original saved image (i.e. a transformed saved image is the first image used in the image analysis to find the expected element). The method may search for the expected image element sequentially using a preferred order of transformed images.

Whilst the search algorithm using image transforms is generally effective at handling different resolutions and configurations of image to suitably transform the reference image to obtain a match, the inventors of the present application have found that unexpectedly high erroneous failure rates can result from transforms of particular reference images.

More particularly, the inventors of the present disclosure have identified, for the first time, that reference images containing text strings are particularly prone to erroneous test failure due the failure to correctly identify an image match using transforms (particularly scaling or rotational transforms) alone.

Therefore, whilst the image 72 (containing only an image) may scale correctly, the "login" button 80 (which contains a text string) may not and an erroneous image match failure may result.

The complication arises from the processes by which modern computing hardware and software systems generate GUI images. The demand for high image quality and rapid scaling of GUI displays by a user (e.g. by pinch zooming/expansion) mean that often if an icon or other GUI image contains a text component (e.g. the "login" icon example above), then the text component is procedurally generated by the SUT. In other words, the text within an icon or other GUI image is generated as scalable vector graphics rather than a bitmap image as is conventional in the art. Often, the situation is complicated by the particular scaling routines being specific to a particular SUT hardware or software configuration or even particular font set.

Figure 7A:
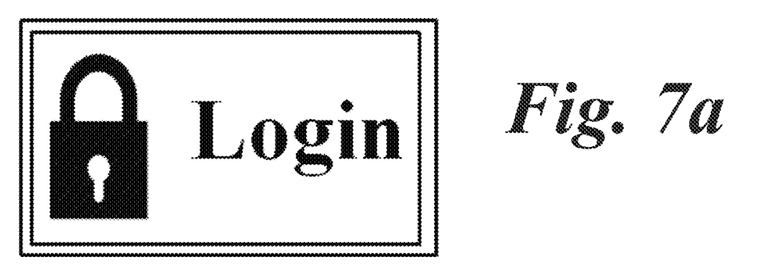
FIG. 7a shows an icon suitable for use as a reference image at a first resolution and image scaling.
Figure 7B:
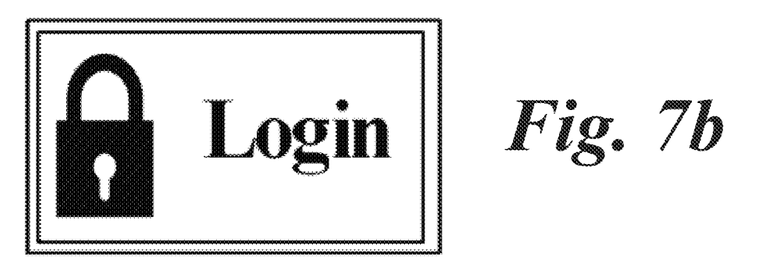
FIG. 7b shows the icon of FIG. 7a but scaled to a larger size.
Figure 7C:
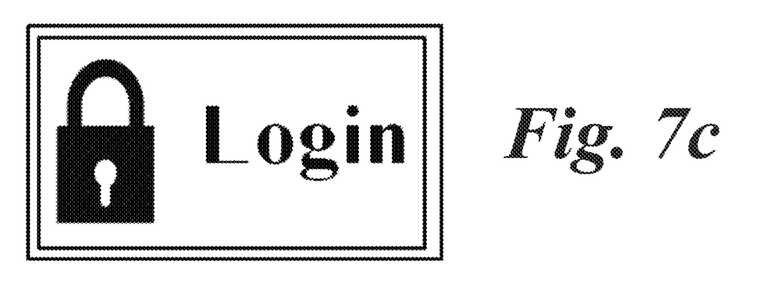
FIG. 7c shows the icon of FIG. 7a but scaled to a smaller size.

Consider FIGS. 7a to 7c which all show an enlarged version of the login icon 80 from FIGS. 5 and 6. FIG. 7a shows the original icon 80 at 1080p resolution and viewed at normal zoom levels (i.e. 100%). The word "Login" is in the Times New Roman font.

FIG. 6b shows a version of FIG. 7a which has been enlarged (but presented as the same size as FIG. 6a for clarity). As shown, the letters of the word "login" are relatively closer together to create a more visually-appealing image than in the original image. Conversely, FIG. 7c shows a version of FIG. 7a which has been scaled down for a smaller resolution screen (but which is presented here as the same size as FIG. 7a for clarity). As shown, the font has been modified significantly from the original. In this case, the serifs (the small lines attached to the end of strokes in a letter or symbol) on the letters of the font (most notably, on the "L", "I" and "N") have been removed to ensure that the font is still readable and looks appropriate on a smaller, low resolution screen.

All of these variations are hardware- and Operating System (OS)-specific and these variations mean that the reference image captured on a reference SUT may be sufficiently different from the image captured on the GUI of another SUT to cause a test to fail erroneously.

The present disclosure, in aspects, addresses this problem. In embodiments, the present disclosure addresses this issue by identifying text within a captured reference image. When the text is identified, the text region is isolated from the remainder of the reference image. An image matching process is then carried out using the remainder of the reference image. The text region can then, if desired, be separately analysed.

Figure 8A:
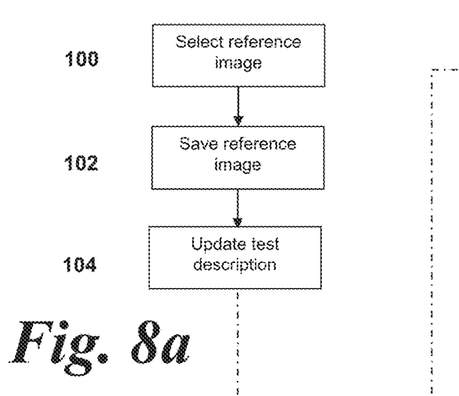
FIGS. 8a to 8c show flow charts according to embodiments of the present disclosure.
Figure 8B:
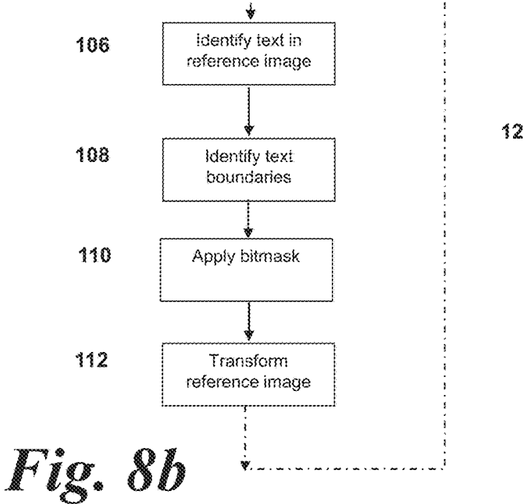
Figure 8C:
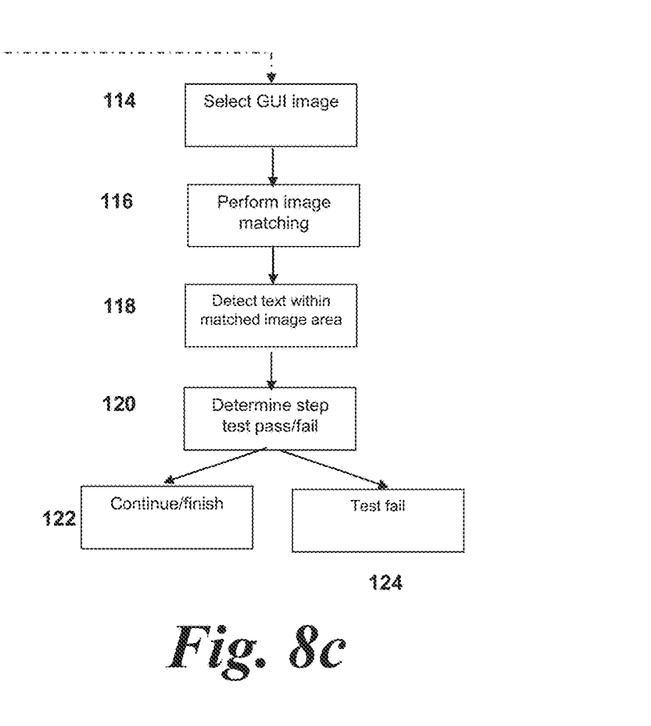

A method according to an embodiment of the present disclosure is described with reference to FIGS. 8a to 8c. FIGS. 8a to 8c show flow charts of embodiments of the present method. FIG. 8a relates to the method of selection of a reference image. FIG. 8b relates to the processing and transformation of a reference image, which may be carried out prior, during, or after an automated test. FIG. 8c relates to the image matching analysis carried out on the GUI of the SUT.

FIG. 8a is a flow chart relating to an aspect of the present disclosure as described below with reference to Steps 100 to 104.

Step 100: Select Reference Image

At step 100, a reference image can be selected by the tester and added to a test description to form part of an automated test.

The tester selects the desired reference image using the copy of the GUI on the test computer system 6. Consider an example of the tester wishing to select the login icon 80 as a desired reference image.

The tester may identify the desired reference object (the icon) to the program in a number of ways. For example, the desired reference object may be identified by a simple selection (e.g. a mouse click or touchscreen press) within the region defined by the icon. Alternatively, the icon may be selected in different ways—for example, if a cursor is held over the icon in a stationary manner for a predetermined amount of time.

As a further alternative, the tester need not select the icon directly. Instead, a selection (e.g. mouse click or touchscreen press) in the vicinity of the icon may prompt the identification of the nearest suitable reference object (i.e. the icon) by the method.

Alternatively or additionally, the icon may be selected by highlighting, selecting or hovering a cursor or mouse pointer over any text associated with the icon.

The above are only non-limiting examples of such a selection process. The skilled person would be readily aware of variations and alternatives that fall within the scope of the present application. The method proceeds to step 102.

Step 102: Save Reference Image

At step 102, the reference image is saved by the test program and associated with metadata such that the test description can utilise the reference image in an automated test.

The reference image can be captured and then stored to memory elements 32 or another storage device as part of the test description 24.

When identified, the user may also be presented with a text box to name the reference image. Alternatively, a name for the reference image may be automatically selected based on particular criteria of the environment surrounding (but not within) the obtained reference image or metadata thereon.

As a further, optional step, the user/tester may have the option to review the captured image prior to the image being saved as part of a test description. The tester can then modify the captured image as required—for example, the tester may wish to crop the image, translate it (e.g. move it left or right) or change the "hotspot" location allocated to that image.

The method proceeds to step 104.

Step 104: Update Test Description

Once the desired reference image has been captured, the test description 24 can be updated to include the new reference image. In the present disclosure, the term "updating" is used to refer to the modification of a test description to include new, changed or otherwise modified elements. This may include, for example, a command line or instruction being added to a new test description as it is being created. Alternatively, it may include the modification or reconfiguration of an existing test description.

If the test description is in the process of being created, there may not be any previous reference images. However, if any reference images do exist, the new reference image may, optionally, replace an existing reference image or images. Alternatively, the new reference image may be added as a second reference image in addition to an existing reference image.

Once the process of updating has been carried out in step 104, the test description may then be used as part of an automated test.

FIG. 8b is a flow chart relating to an aspect of the present disclosure as described below with reference to Steps 106 to 112. It is to be noted that steps 106 to 112 may take place at any suitable time in the testing process. For example, step 106 may follow from step 104 during the test creation process such that text identification, bitmasking and image transformations are completed prior to an automated test being run on the SUT.

Alternatively, steps 106 to 112 may be carried out at runtime of an automated test on the SUT, with text being identified and bitmasked on the fly, and image transformations/scaling being done during the automated test or, for example, in response to a test failure which appears erroneous due to an incorrect scaling or other transform of the reference image.

As a further alternative, steps 106 to 112 may be carried out after an automated test has completed and corresponds to the updating of the test description with image transformed reference image elements with suitable bitmasks prior to the execution of a further automated test. The skilled person would be readily aware of variations of this process which fall within the scope of the present disclosure.

Step 106: Identify Text in Reference Image

At step 106, any text within the reference image is identified. In embodiments, Optical Character Recognition (OCR) is used process the selected reference image to determine whether there is text within the bounds of the selected reference image. The OCR processing is bounded only within the selected reference image. If text is identified, the OCR process is used to parse the character string of the text in the reference image. This character string is then saved in connection with the reference image.

OCR is a particularly useful tool in this instance. However, the skilled person would readily be aware of other identification methods that could be used with the present disclosure. For example, in non-limiting alternative embodiments, the tester may be presented with a display of the reference image and may select the text manually, and may enter the text string manually to be stored with the reference image.

If text is identified in the reference image, the method proceeds to step 108. If no text is identified, the method proceeds to step 112.

Step 108: Identify Text Boundaries

Once text is identified in step 106, the method then proceeds to identify the boundaries of the text within the selected reference image.

This may be done in numerous ways. However, in non-limiting examples, the method identifies the text automatically in the reference image using OCR as in step 104. Alternatively, the text within the desired reference image may be identified using other image processing techniques—for example, as an associated group of pixels having related properties (e.g. visual properties (e.g. chrominance, luminosity), structural properties (e.g. particular patterns or pixel structures)).

As a further non-limiting alternative, the tester may identify the boundary of text within a desired reference image manually.

Once the text boundaries have been identified, the method proceeds to step 110.

Step 110: Apply Bitmask

Once the identification of the region containing text within the reference image boundaries has been identified, the boundaries of that text-containing region are used to apply a bitmask to the reference image.

Figure 9:
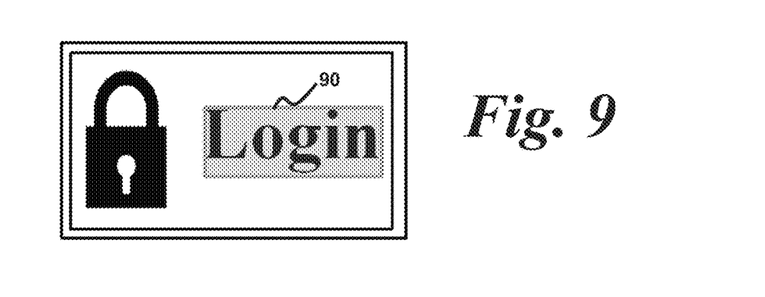

An example of this is shown in FIG. 9 where the bitmasked area 90 is shown as a shaded rectangle. However, whilst the bitmasked area is shown as a rectangle in FIG. 9, this need not be the case. For example, the bitmasked area may follow the text more closely, or may be a freeform analysis. However, a rectangular area is preferred due to the ease of processing of the bitmask.

Alternatively or additionally, the bitmask may be arranged to extend beyond the boundaries of the text by a predefined or calculated value. This boundary extension would allow for variances in the text in the expected image with regard to the reference image. For example, consider that the image of FIG. 6b was the reference image. A bitmask which exactly bounded the "Login" text may cause an image match to fail if the text of the SUT GUI image was in fact that of FIG. 6a, because the text of FIG. 6a extends beyond the boundaries of the text of FIG. 6b and so would not be excluded by the bitmask. As a result, non-excluded or non-bitmasked portions of text in the GUI image may cause a test fail because these artefacts are not present in the non-bitmasked regions of the reference image.

The extension of the bitmask area may depend upon parameters of the reference image (for example, the particular font used) or may be a predefined value, for example, a particular percentage or predefined number of pixels beyond a rectangular bitmask exactly covering the identified text in the reference image. For example, the bitmask area may extend beyond the boundaries of the text by an amount equal to the mean font size in each dimension, or by 5% of the determined area. These values are to be taken as merely exemplary and non-limiting. The skilled person would readily be aware of variations that fall within the scope of the present disclosure.

The bitmask may be applied in a number of ways. Firstly, the bitmask may not alter the reference image but simply cause the bitmasked area to be ignored by the test program when running an automated test to match the reference image (or a scaled version thereof) to an expected image on the SUT. Alternatively, the bitmask may cause the bitmasked area to be deleted entirely.

The skilled person would be readily aware of variations which may fall within the scope of the present disclosure. Once the bitmask has been applied, the method then proceeds to step 112.

Step 112: Transform Reference Image

Once the bitmask has been applied to the reference image, the reference image is transformed as appropriate. In one embodiment, the transformation of the reference image is carried out on only the parts of the reference image which are not covered by the bitmask. In other words, the area of the reference image covered by the bitmask is ignored by the transformation process to generate a transformed reference image. Therefore, the transformed reference image comprises a transformation of the reference image outside of the bounds of the bitmask. This may be accomplished in a number of ways—for example, the bitmasked area may be deleted and the remainder of the image scaled. Alternatively, the reference image may be maintained as captured and the bitmasked area may simply be ignored when scaling.

As an alternative arrangement, the entire reference image could be transformed. For example, instead of transforming only the unmasked area of the reference image, a transform could be applied to the whole reference image and a suitable transform applied to the mask itself. So, for example, a scaling by a factor of two to the reference image would result in the mask being scaled by a factor of two also.

In this exemplary embodiment, the process would scale the entire reference image and then add an appropriate mask to the scaled image. The addition of the mask may be done in any suitable manner. For example, the mask determined in steps 108 and 110 may be scaled in proportion or in relation to the same parameters as the reference image. Alternatively, steps (or further steps) equivalent to steps 108 and 110 may be applied to the transformed reference image to identify the text therein.

Whilst the present method has particular applicability to scaling transforms, other transforms may be used with the present disclosure. For example, other transforms may be used, such as: one or more of: a resolution transformation of the saved image; a one-dimensional (asymmetric) scaling of the saved image; a rotation of the saved image; a vertical mirroring of the saved image; a horizontal mirroring of the saved image; a stretching of the saved image; a skewing of the saved image. The transform may also optionally include a colour transform.

This step may be carried out at any appropriate point in the development of the test description (i.e. prior to automated testing of a SUT) or may be carried out in response to a test failure. The variations of this will be described later.

Numerous different transforms may be applied to the bitmasked reference image. For example, a bank of different bitmasked reference images, all scaled or transformed in a different manner, may be stored and used in the image analysis.

Once the transform(s) of the bitmasked reference image(s) has been carried out, these transforms may optionally be saved and stored to memory elements 32 or another storage device as part of the test description 24.

FIG. 8c is a flow chart relating to an aspect of the present disclosure as described below with reference to steps 114 to 118. Steps 114 onwards describe the steps of an image matching process which is carried out as part of an automated test. An automated test may comprise a large number of such image matching processes, as part of a sequence of test and validation steps to test a SUT. The particular analysis and validation steps carried out are determined by the test description 24.

Step 114: Select GUI Image

As part of an automated test as defined by the test description, the test computer selects the latest GUI image stored by the memory element 32 prior to performing image analysis on the GUI image to find a particular reference or "expected" image.

The method proceeds to step 116.

Step 116: Perform Image Matching

Once the GUI image has been obtained in step 114, image analysis is performed to identify an "expected image" or reference image in the captured GUI image. In use, when performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image. For example, they may be identical to the expected image save for, for example, a scaling or other dimensional transform, or a colour transform as described above.

In embodiments, the test program may utilise various methods of performing this image analysis and may try to 'match' the reference image to at least a portion of the GUI image/s using any suitable image analysis technique. This may include, for example, having to re-size or rotate the reference image to find a match. The skilled person would be readily aware of techniques which could be used to determine whether an expected image has been found.

The "expected image" may be the whole GUI image or, alternatively, one or more parts of the GUI image, for example, an icon. Consider the login icon 80 described with reference to FIGS. 6a to 6c and FIG. 9.

The test algorithm searches for an image on the GUI which matches the transformed or stored reference image including the bitmask. In other words, the image matching is performed to find a match between the transformed reference image minus the bitmasked area defined in the steps above and the images on the GUI.

To perform the image matching, a suite of different transforms of the reference image may be used, for example reference images at different scales and/or resolutions. In each case, any areas of the reference image or scaled/transformed reference image(s) which contain text and have been previously bitmasked are ignored during this process.

The method then proceeds to step 118.

Step 118: Detect Text within Matched Image Area

If a match to the bitmasked reference image or a transformed/scaled bitmasked reference image is found (i.e. a match in the GUI is found for a reference image or transformed reference image minus any bitmasked areas identified previously as text), then the method is optionally operable to carry out detection of the text in the matched image forming part of the GUI of the SUT.

Text may be identified and parsed using OCR to identify the text string. This can then be compared to the text string identified in the reference image in step 106.

The method then proceeds to step 120.

Step 120: Determine Step Test Pass/Fail

Based on the image analysis carried out in step 116 and, optionally, the text analysis in step 118, it is then determined whether the expected image is found in the GUI image obtained in step 114.

It may be determined that an image is found based solely on the analysis in step 116. Alternatively, an image may only be deemed found if the analysis in step 116 (i.e. image analysis) and also the text analysis in step 118 are both positive.

If the expected image is found, the method proceeds to step 122. If the expected image is not found, the method proceeds to step 124.

Step 122: Continue/Finish

At step 122, an expected image has been detected and so it is determined that the test has been completed correctly. Any further steps of the test description 24 may be carried out as required, which may involve further verifications and/or instructions. Alternatively, the method may finish with a report of a test pass.

Step 124: Test Fail

If an expected image is not detected in step 114 then the test has failed and this is reported to the tester for further consideration.

As set out above, some embodiments of the present disclosure may provide various advantages over known arrangements. For example, various embodiments of the present disclosure are operable to handle different text scaling systems across a multitude of different operating systems and hardware configurations. Some embodiments of the method disclosed herein may provide an updated test description 24 which is more robust and reliable than a test description developed using conventional techniques, and a more reliable automated test. The improved test description 24 formed by some methods of the present disclosure, as a result, may be more reliable and less prone to erroneous failures than known arrangements, providing a technical advantage over known arrangements.

Variations falling within the scope of the present disclosure will be appreciated by the skilled person. For example, as described above, instead of transforming only the unmasked area of the reference image, a transform could be applied to the whole reference image and a suitable transform applied to the mask itself. So, for example, a scaling by a factor of two to the reference image would result in the mask being scaled by a factor of two also.

As set out above, the method steps could be performed at different portions of the test generation and execution sequence. For example, the tester could define that they want to use the text mask approach when they define the test description. In that example, steps 106 to 112 may follow from step 104 during the test creation process such that text identification, bitmasking and image transformations are completed prior to an automated test being run on the SUT.

Alternatively or additionally, the tester may define the preferred search algorithm when the test description is defined. It is also possible to select an option to use other algorithms if the selected algorithm fails to find a match. For example, if a reference image is not found using another search algorithm, the text masking algorithm could be implemented at runtime of the automated test. Therefore, in other words, steps 106 to 112 may be carried out at runtime of an automated test on the SUT, with text being identified and bitmasked on the fly, and image transformations/scaling being done during the automated test or, for example, in response to a test failure which appears erroneous due to an incorrect scaling or other transform of the reference image.

Finally, as a further addition and/or alternative, as set out above, steps 106 to 112 may be carried out after an automated test has completed and corresponds to the updating of the test description with image transformed reference image elements with suitable bitmasks prior to the execution of a further automated test. The skilled person would readily be aware of variations of this process which fall within the scope of the present disclosure.

Figure 10:
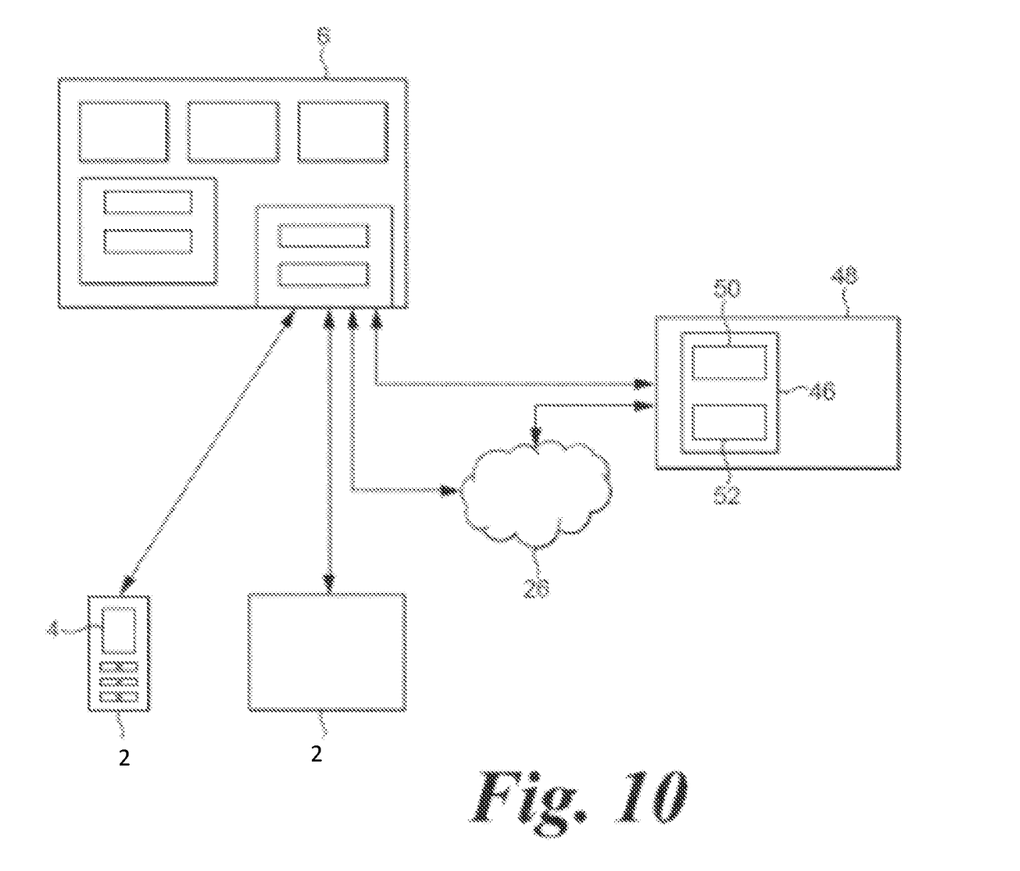
FIG. 10 shows an example of a test computer system in communication with several systems under test and a remote server comprising a database.

FIG. 10 shows an example of a system using the method as described herein where reference images are stored upon an external memory/storage device that is remote from the test computer system.

The external device may be a central server or other computer system with access to one or more communication devices such that one or multiple test computer systems 6 can send or retrieve reference images to/from the server.

The server may operate one or more databases or other information handling systems on one or more memory devices. The databases may store multiple different reference images. One database 50, or a part of one or more databases, may be available to all test computer systems 6 or a set of one or more test computer systems and store reference images generated from those test computer systems 6. The test systems 6 with access to that database 50 may therefore be able to access the reference images created by other test computer systems 6. This may be beneficial, for example, where different companies that make software applications 20 (and test them using a test system as described) need to update reference images because of a new change in a common operating system 16 that their application programs 20 run upon. If a first user creates reference images according to any of the methods described herein and stores them on the database 50, then other users can subsequently use the same reference images by retrieving them from the same accessible database 50, therefore saving processing time.

The server may also comprise restricted database records 52 that only one or a select subset of test computers 6 or users can access. This may be useful, for example, where a particular company is testing a new version of its own software 20 and does not want others outside its organisation to see its new images prior to release of the software 20.

Embodiments of the present disclosure have been described with particular reference to the examples illustrated. However, it will be appreciated that variations and modifications may be made to the examples described within the scope of the present disclosure.

As set out above, the steps of identification of text and addition of a bitmask prior to scaling (or other transform) can be done at any suitable time, either during development of a test description, during execution of an automated test or after a step or sequence of steps of the automated description (for example, after a step has failed to identify a reference image).

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realised by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

What is claimed is:

1. A method for performing an automated computer test using a test description, the automated test being configured, when executed, to cause a test computer system to communicate with a graphical user interface (GUI) of a system under test (SUT) comprising one or more computer programs being executed upon a computer device, wherein the test description is configured to be executed by a test program to cause the test computer system to perform an automated computer test by comparing a received image from a GUI of the system under test with one or more reference images to identify an expected image, the method comprising:

a) receiving a reference image representative of an expected image on the GUI of the SUT, the reference image having an image boundary;
   b) updating the test description with the received reference image;
   c) identifying whether one or more text characters are present within the image boundary of the reference image, wherein step c) further comprises storing the identified text characters as text characters associated with the reference image;
   d) responsive to any identified text characters in step c), defining a mask region within the reference image boundary based on the identified text characters;
   e) applying one or more image transformations to the reference image to generate transformed reference images, wherein the one or more image transformations are applied only to an unmasked portion of the reference image to generate the transformed reference images or the one or more image transformations are applied to the whole of the reference image and a correspondingly transformed mask applied to the transformed reference images, wherein the one or more image transformations comprise a stretch or skew of the unmasked portion of the reference image and the transformed reference images comprise one or more respective stretches or skews of the unmasked portion of the reference image;
   f) after generating the transformed reference images, performing image analysis to identify a transformed expected image on the GUI of the SUT using the transformed reference images, wherein the image analysis comprises matching an unmasked portion of a transformed reference image to a portion of the GUI of the SUT, wherein the unmasked portion of the transformed reference image is visually different from a corresponding portion of the reference image;
   g) responsive to the identification of a transformed expected image, performing subsequent operations and/or verification steps on the system under test, wherein, subsequent to step f), responsive to the identification of a transformed expected image within a portion of the GUI of the SUT, the method further comprises:
   h) identifying, within the portion of the GUI of the SUT, any text characters, wherein subsequent to step h), the method further comprises:
   i) comparing the identified text characters within the portion of the GUI of the SUT with the text characters associated with the reference image, wherein step g) is carried out responsive to identification of the expected image and a correspondence between the identified text characters within the portion of the GUI of the SUT and the text characters associated with the reference image.

2. A method according to claim 1, wherein step d) further comprises determining the boundaries of each text character in the reference image.

3. A method according to claim 2, wherein step d) further comprises defining the mask region to be equal to or greater than the boundaries of each text character in the reference image.

4. A method according to claim 1, wherein the one or more image transformations comprise a dimensional scaling of the reference image and the transformed reference images comprise one or more dimensional scalings of the reference image.

5. A method according to claim 1, wherein the one or more image transformations comprise a rotation of the reference image and the transformed reference images comprise one or more respective rotations of the reference image.

6. A method according to claim 1, wherein step b) comprises identifying one or more text characters using optical character recognition.

7. A method according to claim 1, wherein steps a) to e) are performed prior to execution of an automated test on a SUT.

8. A method according to claim 1, wherein steps a) to e) are performed during execution of an operation or validation step during an automated test on a SUT.

9. A method according to claim 1, wherein the reference images are generated responsive to the failure to identify a transformed expected image using the reference image.

10. A non-transitory computer readable medium comprising instructions configured when executed to carry out a method for performing an automated computer test using a test description, the automated test being configured, when executed, to cause a test computer system to communicate with a graphical user interface (GUI) of a system under test (SUT) comprising one or more computer programs being executed upon a computer device, wherein the test description is configured to be executed by a test program to cause the test computer system to perform an automated computer test by comparing a received image from a GUI of the system under test with one or more reference images to identify an expected image, the method comprising:
  a) receiving a reference image representative of an expected image on the GUI of the SUT, the reference image having an image boundary;
  b) updating the test description with the received reference image;
  c) identifying whether one or more text characters are present within the image boundary of the reference image, wherein step c) further comprises storing the identified text characters as text characters associated with the reference image;
  d) responsive to any identified text characters in step c), defining a mask region within the reference image boundary based on the identified text characters;
  e) applying one or more image transformations to the reference image to generate transformed reference images, wherein the one or more image transformations are applied only to an unmasked portion of the reference image to generate the transformed reference images or the one or more image transformations are applied to the whole of the reference image and a correspondingly transformed mask applied to the transformed reference images, wherein the one or more image transformations comprise a stretch or skew of the unmasked portion of the reference image and the transformed reference images comprise one or more respective stretches or skews of the unmasked portion of the reference image;
  f) after generating the transformed reference images, performing image analysis to identify a transformed expected image on the GUI of the SUT using the transformed reference images, wherein the image analysis comprises matching an unmasked portion of a transformed reference image to a portion of the GUI of the SUT, wherein the unmasked portion of the transformed reference image is visually different from a corresponding portion of the reference image;
  g) responsive to the identification of a transformed expected image, performing subsequent operations and/or verification steps on the system under test, wherein, subsequent to step f), responsive to the identification of a transformed expected image within a portion of the GUI of the SUT, the method further comprises:
  h) identifying, within the portion of the GUI of the SUT, any text characters, wherein subsequent to step h), the method further comprises:
  i) comparing the identified text characters within the portion of the GUI of the SUT with the text characters associated with the reference image, wherein step g) is carried out responsive to identification of the expected image and a correspondence between the identified text characters within the portion of the GUI of the SUT and the text characters associated with the reference image.

11. A computer system comprising:
a processing device,
a storage device; and
a non-transitory computer readable medium encoded with instructions that when executed cause the processing device to carry out a method for performing an automated computer test using a test description, the automated test being configured, when executed, to cause a test computer system to communicate with a graphical user interface (GUI) of a system under test (SUT) comprising one or more computer programs being executed upon a computer device, wherein the test description is configured to be executed by a test program to cause the test computer system to perform an automated computer test by comparing a received image from a GUI of the system under test with one or more reference images to identify an expected image, the method comprising:
  a) receiving a reference image representative of an expected image on the GUI of the SUT, the reference image having an image boundary;
  b) updating the test description with the received reference image;
  c) identifying whether one or more text characters are present within the image boundary of the reference image, wherein step c) further comprises storing the identified text characters as text characters associated with the reference image;
  d) responsive to any identified text characters in step c), defining a mask region within the reference image boundary based on the identified text characters;
  e) applying one or more image transformations to the reference image to generate transformed reference images, wherein the one or more image transformations are applied only to an unmasked portion of the reference image to generate the transformed reference images or the one or more image transformations are applied to the whole of the reference image and a correspondingly transformed mask applied to the transformed reference images, wherein the one or more image transformations comprise a stretch or skew of the unmasked portion of the reference image and the transformed reference images comprise one or more respective stretches or skews of the unmasked portion of the reference image;

f) after generating the transformed reference images, performing image analysis to identify a transformed expected image on the GUI of the SUT using the transformed reference images, wherein the image analysis comprises matching an unmasked portion of a transformed reference image to a portion of the GUI of the SUT, wherein the unmasked portion of the transformed reference image is visually different from a corresponding portion of the reference image;

g) responsive to the identification of a transformed expected image, performing subsequent operations and/or verification steps on the system under test, wherein, subsequent to step f), responsive to the identification of a transformed expected image within a portion of the GUI of the SUT, the method further comprises:

h) identifying, within the portion of the GUI of the SUT, any text characters, wherein subsequent to step h), the method further comprises:

i) comparing the identified text characters within the portion of the GUI of the SUT with the text characters associated with the reference image, wherein step g) is carried out responsive to identification of the expected image and a correspondence between the identified text characters within the portion of the GUI of the SUT and the text characters associated with the reference image.

* * * * *